(12) United States Patent
Sadaghiani et al.

(10) Patent No.: US 10,643,216 B2
(45) Date of Patent: *May 5, 2020

(54) SYSTEM AND METHODS FOR DYNAMIC DIGITAL THREAT MITIGATION

(71) Applicant: Sift Science, Inc., San Francisco, CA (US)

(72) Inventors: Fred Sadaghiani, San Francisco, CA (US); Micah Wylde, San Francisco, CA (US); Keren Gu, San Francisco, CA (US); Eugenia Ho, San Francisco, CA (US); Noah Grant, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,593

(22) Filed: Mar. 19, 2019

(65) Prior Publication Data

US 2019/0213595 A1 Jul. 11, 2019

Related U.S. Application Data

(63) Continuation of application No. 15/922,746, filed on Mar. 15, 2018, now Pat. No. 10,284,582, which is a
(Continued)

(51) Int. Cl.
*G06F 21/50* (2013.01)
*G06F 21/55* (2013.01)
(Continued)

(52) U.S. Cl.
CPC ....... *G06Q 20/4016* (2013.01); *G06F 16/285* (2019.01); *G06N 20/00* (2019.01);
(Continued)

(58) Field of Classification Search
CPC ............ H04L 63/1416; G06Q 20/4016; G06N 20/00; G06N 99/005; G06F 16/285
See application file for complete search history.

(56) References Cited

U.S. PATENT DOCUMENTS

| 8,306,889 B2 | 11/2012 | Leibon et al. |
| 8,918,430 B2 | 12/2014 | Fischer |

(Continued)

*Primary Examiner* — Noura Zoubair
(74) *Attorney, Agent, or Firm* — Padowithz Alce

(57) ABSTRACT

Systems and methods include: receiving digital event type data that define attributes of a digital event type; receiving digital fraud policy that defines a plurality of digital processing protocols; transmitting via a network the digital event data and the digital fraud policy to a remote digital fraud mitigation platform; using the digital event data to configure a first computing node comprising an events data application program interface or an events data computing server to detect digital events that classify as the digital event type; using digital fraud policy to configure a second computing node comprising a decisioning API or a decisioning computing server to automatically evaluate and automatically select one digital event processing outcome of a plurality of digital event processing outcomes that indicates a disposal of the digital events classified as the digital event type; and implementing a digital threat mitigation application process flow that evaluates digital event data.

15 Claims, 3 Drawing Sheets

Related U.S. Application Data continuation of application No. 15/653,354, filed on Jul. 18, 2017, now Pat. No. 9,954,879.

(60) Provisional application No. 62/533,564, filed on Jul. 17, 2017.

(51) Int. Cl.
*H04L 29/06* (2006.01)
*G06N 99/00* (2019.01)
*G06Q 20/40* (2012.01)
*G06N 20/00* (2019.01)
*G06F 16/28* (2019.01)

(52) U.S. Cl.
CPC .......... *H04L 63/1416* (2013.01); *G06F 21/50* (2013.01); *H04L 63/1433* (2013.01)

(56) References Cited

U.S. PATENT DOCUMENTS

| | | | |
|---|---|---|---|
| 9,178,908 B2 | 11/2015 | Call et al. | |
| 2013/0024375 A1* | 1/2013 | Choudhuri | G06Q 40/00 705/44 |
| 2015/0373043 A1 | 12/2015 | Wang et al. | |
| 2016/0055334 A1 | 2/2016 | Herwono et al. | |

* cited by examiner

IDENTIFYING EVENT DATA S210

IDENTIFYING THREAT MITIGATION S220

CONSTRUCT APP FLOWS S230

DEPLOY APP FLOWS S240

FIGURE 2

SYSTEM AND METHODS FOR DYNAMIC DIGITAL THREAT MITIGATION

CROSS-REFERENCE TO RELATED APPLICATIONS

This application is a continuation of U.S. patent application Ser. No. 15/922,746, filed 15 Mar. 2018, which is a continuation of U.S. patent application Ser. No. 15/653,354, filed on 18 Jul. 2017, which claims the benefit of U.S. Provisional Application No. 62/533,564, filed on 17 Jul. 2017, which are all incorporated herein in their entireties by this reference.

TECHNICAL FIELD

This invention relates generally to the digital fraud and abuse field, and more specifically to a new and useful system and method for generating and implementing digital threat mitigation applications in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the web.

While there may currently exist some technologies that attempt to detect digital fraud and digital abuse or other malicious digital activities over the web, these existing technology implementations may not sufficiently detect malicious digital activities over the web with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of digital threats and evolution of a digital threat mitigation platform to address new digital threats. The embodiments of the present application described herein provide technical solutions that address, at least, the need described above.

BRIEF DESCRIPTION OF THE FIGURES

FIG. 2 illustrates an example method in accordance with one or more embodiments of the present application.

DESCRIPTION OF THE PREFERRED EMBODIMENTS

Figure 1:
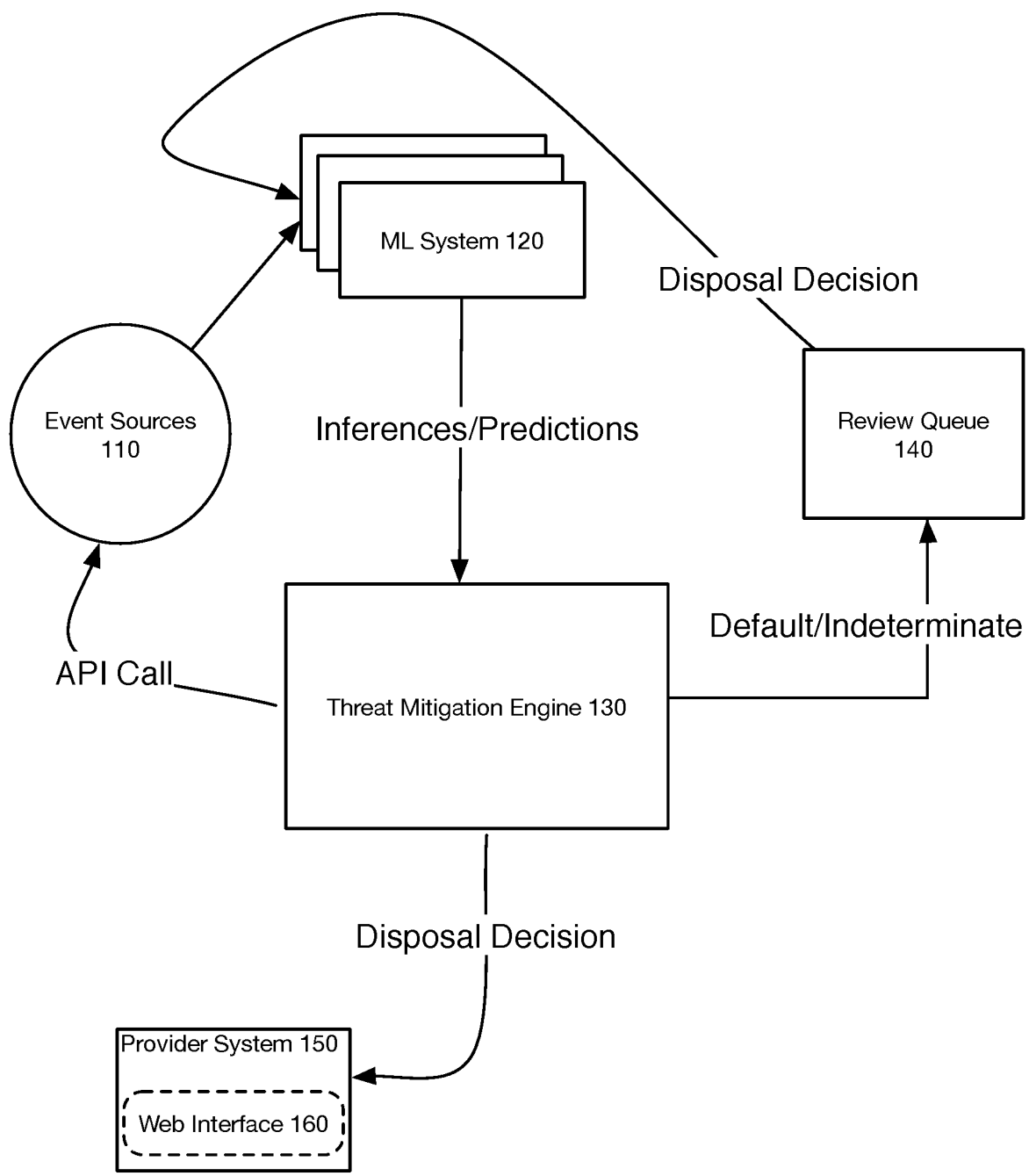
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, and/or activities (exceeding billions in number) occurring over the web and/or Internet highlight the many deficiencies of traditional digital fraud detection implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital threats stemming from the malicious or fraudulent activities.

The advanced technology platform of many embodiments of the present application employs a robust ensemble of machine learning models and related systems that operate to ingest the great number of digital activities performed and events occurring over the web and parse from these great number of digital activities and events a subset of these activities and events that present the greatest likelihood of involving digital fraud and/or digital abuse. Accordingly, using these finely tuned and perpetually tunable machine learning models, a system implementing the several embodiments of the present application can predict and/or estimate with high accuracy and, in some embodiments, in real-time (e.g., as the event is occurring or shortly thereafter) a digital threat score for each event or activity that is sifted by the system.

The digital threat score may be exposed via a score application program interface (API) that may function to interact with various endpoints of the digital threat mitigation platform. Specifically, the score API may function to interact with one or more web computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

Additionally, the embodiments of the present application further enable the configuration of new digital threat mitigation protocols or implementations automatically upon a detection of a new (or evolved) digital threat or semi-automatically with digital threat input from an entity. That is, in some instances, the digital events and activities occurring via the Internet or web (including web and mobile applications) give rise to an unclassified or not fully classified potential digital threat that may require additional or new digital threat mitigation measures that may effectively mitigate the fraud risks associated the digital events. In such instances, the embodiments of the present application employ a digital threat mitigation engine that is capable of building new digital threat mitigation protocols or implementations that function to mitigate or eliminate digital threats posed by the unclassified or not fully classified potential digital threat. It shall be noted that, in some embodiments, the digital event posing the potential digital threat may be a classified digital event (e.g., payment abuse), however, due to the digital risks or other risks of loss, enhanced or new digital threat detection protocols according to the several embodiments of the present application may need to be implemented in the course of evaluating and processing the digital event.

Using a combination of the digital threat score calculated for a digital actor and/or digital event and a web user interface, the embodiments of the present application enable the definition of new or evolved digital threat mitigation protocols executed in association with a digital threat mitigation engine. In particular, via the web user interface, it is possible to identify or define digital events or digital activities occurring over the web or Internet that may be used to trigger a digital intervention (e.g., implementation the new digital threat mitigation protocols) and digital event or digital activity processing. The web user interface may similarly be used to define the specific routines and procedures executed by the digital threat mitigation engine once the threat mitigation protocols have been triggered.

The digital threat mitigation engine functions to use, as input, a digital threat score and service provider-defined digital threat mitigation protocols to generate one or more digital threat mitigation implementations, such as a digital threat mitigation flow. For instance, the digital threat mitigation engine may function to further configure an events API to parse events or activity data from multiple events data sources to identify specific events data that may trigger the new digital threat mitigation implementations. In such instance, one aspect of the one or more digital threat mitigation implementations may include digitizing the defined digital threat mitigation protocols for integration and enhancement of digital threat mitigation capabilities of a pre-existing and broader digital threat mitigation platform. Additionally, the outputs (e.g., disposal decisions) of the digital threat mitigation engine may be provided to a machine learning component of the engine to improve its ability to detect new digital threats. Several of these aspect of the embodiments of the present application are discussed in more detail in the following description.

1. System for Constructing & Implementing Digital Threat Mitigation

As shown in FIG. 1, a system 100 for mitigating digital threats includes a plurality of event sources 110, a machine learning digital fraud detection system 120, a digital threat mitigation engine 130, a review queue 140, a service provider system 150, and web interface 160.

The system 100 functions to enable real-time automatic fraud detection and augmentation of automatic fraud-detecting capabilities of a pre-existing system. The system 100 provides web interface 160 that enable users to identify digital circumstances or digital events that may have a high risk of digital fraud. Additionally, the system 100 may be provided with digital fraud mitigation policies that may be used to generate applications and digital process flow that can be used to detect the potentially fraudulent events or circumstances. Accordingly, the system 100 may function to build a digital fraud detection and processing mechanism that may be used to augment an existing and broader digital fraud detection system thereby improving an overall technical capability of the broader system to identify digital fraud and deploy fraud mitigation protocols.

The plurality of event sources 110 function as sources of digital events and digital activities, occurring fully or in part over the Internet or the web. The plurality of events sources may include a plurality of web servers associated with a plurality of entities seeking to mitigate fraudulent activities involving digital resources of said entities or the like. Accordingly, the plurality of event sources 110 may also include the service provider system 150.

The plurality of event sources 110 function to capture and/or record any digital activities and/or digital events occurring over the Internet or web involving the web servers of the entities and/or other digital resources (e.g., web pages, web transaction platforms, Internet-accessible data sources, etc.) of the entities. The digital events and digital activities collected by the plurality of event sources 110 may function as input data sources of the machine learning digital fraud detection system 120.

The machine learning digital fraud detection system 120 functions to identify or classify the distinct digital events data and digital activity data received from the plurality of event sources 110. The machine learning digital fraud detection system 120 may be implemented by a plurality of computing servers (e.g., a combination of web servers and private servers) that implement an ensemble of machine learning models. The ensemble of machine learning models may include hundreds and/or thousands of machine learning models that work together to classify features of digital events data and namely, to classify or detect features that may indicate a possibility of fraud or not. The machine learning fraud detection system 120 may additionally utilize the input from the plurality of event sources 110 and various other data sources (e.g., outputs of system 100, system 100 derived knowledge data, external entity-maintained data, etc.) to continuously improve or accurately tune weightings associated with factors of the ensemble of the machine learning models.

The ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100.

The digital threat mitigation engine 130 functions to construct digital threat mitigation flows and implement the constructed digital threat mitigation flows to enable the digital processing of digital events and/or activities having a high susceptibility or probability of fraud, cyber fraud, or other digitally harmful activities. The digital processing functionality of the digital threat mitigation flow may include the detection of digital fraud within the digital events and deployment of digital fraud mitigation protocols. Additionally, or alternatively, the digital processing functionality may include timely and/or real-time processing of the digital events to automated decision or disposal. Using the web interface 160, a client system may be used to construct flow parameters that the digital threat mitigation engine 130 uses to construct digital threat mitigation flows.

The flow parameters provided via the web interface 160 may include a combination of a digital triggering event, a digital actor (e.g., an online user), digital fraud type and associated threat score thresholds for multiple tiers or stages of digital event evaluation, and disposal decisions and/or actions that indicate a disposition of the digital event. The digital triggering event may be any digital action or digital activity initiated by one or more actors that may be used to initiate a digital threat mitigation flow (e.g., an Internet or web occurrence involving a digital resource of or a digital service provided by an entity).

In one embodiment of the present application, the digital threat mitigation engine 130 may then function to ingest the flow parameters and construct the digital threat mitigation flows. Constructing the digital threat mitigation flows by the digital threat mitigation engine 130 may include setting digital triggering event as an initiator of the flow, configuring multi-tiered or multi-staged computing nodes that may be used to determine an automated disposition of the digital triggering event, and configuring computing nodes that process the automated disposition.

Accordingly, in use, the initiation of the digital threat mitigation flow may preferably be triggered by an occurrence (or receipt from a client system) of the defined digital triggering event. The digital threat mitigation flow, using the client-system defined flow parameters, may function to process and/or evaluate the digital triggering event together with an associated digital actor (if provided) until an automated disposal decision or recommendation is generated by the digital threat mitigation engine 130. Generally, the automated disposal decision or recommendation may be transmitted to the service provider system 150 and may also be converted to machine learning input into the machine learning digital threat mitigation system 120. Accordingly, outputs of the digital threat mitigation engine 130 and review queue engine 140 (as described in more detail below) may be routed to the machine learning system 120 for improving of the digital fraud and/or digital abuse detection capabilities thereof.

In one aspect of the digital threat mitigation engine 130, a reviewing queue engine 140 may be implemented in combination with the digital threat mitigation engine 130. The reviewing queue engine 140 may preferably be implemented in the circumstances in which an automated disposition for a digital triggering event may be undiscernible (e.g., a triggering digital event does not match or satisfy evaluation flow parameters of the automated decisioning node or the like) by the automated decisioning node (or similar decisioning node of the digital threat mitigation engine 130) or discernible with very low confidence (e.g., confidence being below a minimum confidence threshold) by the digital threat mitigation engine 130 using a digital threat mitigation flow. In such cases, the digital threat mitigation engine 130 may cease processing the triggering digital event according to the digital threat mitigation flow and as a default, flag the digital event as requiring additional scrutiny or review and transmit the triggering digital event to the reviewing queue engine 140.

In some embodiments, the reviewing queue engine 140 functions to discern the triggering digital events deemed undiscernible by preceding nodes of the digital threat mitigation engine 130. Additionally, or alternatively, the reviewing queue engine 140 may function to discern and provide a disposal decision for any digital event data or triggering digital event that was processed through a default node of a preceding node; meaning that the preceding node may not have been able to provide a disposal decision for the digital event data. The reviewing queue engine 140 additionally functions to arrange the received triggering digital events according to a priority (e.g., according to highest probability of fraud, based on time of receipt or occurrence, or according to greatest potential loss due to fraud, and the like). The reviewing queue engine 140 may be implemented semi-automatically using a combination of manual and automated reviewing protocols implemented by a computing node (e.g., a computing server, computing processor, etc.) that may function to apply predetermined review rules, heuristics, or judgements for undiscernible digital events. The manual review component of the reviewing queue engine 140 may include one or more human analyst or digital fraud experts that may assist in discerning the digital event by providing review input regarding a perceived fraudulent nature of the digital event. For instance, the human analyst may produce a threat score or fraud score for a perceived level of payment abuse for the digital event. The analyst review input may additionally include an enumeration of factors and possible weightings for each of the factors contributing to the analyst's reviewing input (e.g., payment abuse scoring or digital actor scoring).

Additionally, or alternatively, the reviewing queue engine 140 may include one or more sub-nodes, which may include a default sub-node. Thus, the review of the digital event either by a computing server and/or the human analyst may be set to follow an ordered progression of the one or more sub-nodes of the reviewing queue engine 140 such that if a disposal decision cannot be made for the digital event data at a predicate or intermediate sub-node of the reviewing queue engine 140, the default sub-node may be automatically executed by the reviewing queue engine 140 to produce a disposal decision for the digital event data.

The disposal decision generated at the reviewing engine queue 140 together with the review input may, in turn, be converted by the system 100 to useable machine learning input into the machine learning digital fraud detection system 120. Thus, the reviewing queue input and disposal decision may be consumed by the machine learning digital fraud detection system 120 as machine learning training data that may be used to adjust weightings of one or more factors of or add new factors (features) with weightings to the existing machine learning models implemented by the machine learning digital fraud detection system 120 thereby improving the technical capabilities of the machine learning digital fraud detection system 120 to evaluate and determine a digital threat level (e.g., digital threat score) associated with digital event data. Additionally, or alternatively, the reviewing input and disposal decision may be consumed by the machine learning digital fraud detection system 120 or generally, by the system 100 to generate one or more new machine learning models incorporating the weightings and/or factors from the reviewing input. The system 100 may function to augment the existing machine learning models implemented by the machine learning digital fraud detection system 120 with the one or more new machine learning models. Converting the disposal decisioning and reviewing input in this way to form machine learning input effectively evolves the fraud detection and technical operability of the underlying computers implementing the machine learning models. In particular, the system 100 implementing the machine learning models would function to identify fraudulent digital activity with faster and with greater accuracy (e.g., better/improved classifications or predictions of fraud).

The provider 150 functions to provide digital events data to the one or more digital event processing components of the system 100. Preferably, the provider 150 provides digital events data to an events application program interface associated with the digital threat mitigation engine 130. The provider 150 may be any entity or organization having a digital online presence that enable customers or users of the digital resources associated with the entity's online presence to perform transactions, exchanges of data, perform one or more digital activities, and the like.

The provider 150 may include one or more computing servers and/or computing devices. Preferably, the provider 150 includes a client devices in operable communication via the web user interface 160 with the digital threat mitigation engine 130. In this way, the provider 150 may be able to define triggering digital events and associated digital fraud mitigation policies that may be used to construct fraud mitigation application flows that provide a predefined order for processing digital events data.

The web interface 160 functions to enable a client system or client device to operably interact with a remote digital threat mitigation platform of the present application. The web interface 160 may include any suitable graphical frontend that can be accessed via a web browser using a computing device. The web interface 160 may function to provide an interface to provide inputs for constructing a digital threat mitigation application flow. For instance, the web interface 160 may provide multiple intuitive input boxes and instruction for defining a decision tree of logic that may be used in generating the predefined ordered process flow of the digital threat mitigation application flow used for processing digital events data.

Additionally, or alternatively, the web interface 160 may function to enable an administrator of an entity to view and/or manage entity data provided to the system 100 and also status information of any pending digital threat mitigation application flow.

The web interface 160 may be used by an entity to make any suitable request including requests to build new digital threat mitigation process application flows, requests to perform synchronous processing of digital event data, requests for status information of a digital threat mitigation application flow in progress, and the like.

2. Method for Automatic Fraud Detection

As shown in FIG. 2, the method 200 includes identifying digital event data (e.g., triggering events) S210, identifying a digital threat mitigation process (e.g., triggered application flows) S220, constructing digital threat mitigation application flows S230, and deploying a constructed digital threat mitigation application flow into and existing digital threat mitigation scheme S240.

The method 200 functions enable the construction of digital threat mitigation application flows that include ordered computer processes and routines that function to automate fraud and general processing decisioning of digital events or activities. Because the method 200 enables an intuitive construction of digital threat mitigation application flows, a system implementing method 200 may function to accurately and efficiently implement new threat detection and threat mitigation protocols to address previously underrecognized cyber or digital fraud threats. These new threat detection and threat mitigation protocols may be implemented by the digital threat mitigation platform and preferably, by a machine learning system therein capable of detecting new digital threat patterns in real-time or near real-time.

S210, which includes identifying digital event data, functions to enable an identification of a digital event type occurring over the web or Internet (including Internet-enabled platforms) that may pose a potential digital threat risk. The digital event type may relate to a category or a classification of a digital occurrence including digital transactions (e.g., online purchase transactions, online money transfers, online account openings, etc.), digital activities (e.g., user activities on an online web page) or transactions that may be initiated by or involves at least one user (e.g., digital actor or digital user). While, in many embodiments, the digital event type relates to a digital event or digital activity that may occur over the web or the Internet, the digital event type may also include events and/or activities that occur or are initiated outside of the web or the Internet (e.g., in the real world) in which some part of the event or activity involves the web or Internet.

The potential digital threat risks that the method 200 functions to mitigate may include, but is not limited to, any type of digital misappropriation or digital fraud, any type of cyber intrusion (e.g., hacking), digital identity theft, digital account misappropriation, payment abuse, and the like.

Accordingly, S210 preferably includes receiving digital event type data that preferably define properties of the digital event type including characteristics, details, and/or attributes of the digital event type that may be useable by the system implementing method 200 to detect digital events among a plurality of disparate digital events that may be classified as the digital event type.

S210 preferably functions to receive the digital event type data via a web user interface. The web user interface that is configured to receive the digital event type data may be in operable communication, via the Internet or other network, with one or more remote web servers of a digital threat mitigation platform (e.g., a system implementing method 200). While, in several embodiments, the digital event type data is received via a web user interface, it shall be noted that the digital event type data may be received in any suitable manner.

Additionally, the digital event type data may include an indication of digital event data describing details and attributes of particular digital occurrences which an entity desires to automatically trigger the digital event evaluation and decisioning processes of a digital threat mitigation application flow. For instance, an indicated digital event may be "user online order completion". Thus, a system implementing method 200 may be configured to, upon detecting or receiving a digital event that includes a user completing an online order, implement a digital threat mitigation application flow that evaluates the attributes of the online order completion.

Additionally, or alternatively, S210 includes using the digital event type data in configuring a digital events computing node. The events computing node may include one or a combination of an events application program interface (API) and an events computing server (e.g., a web server or implemented via a distributed networked computing system (e.g., the cloud)). The events computing node preferably functions to collect digital events data and digital activities data from a plurality of event data sources. The plurality of event data sources may include a plurality of private computing servers, web computing servers, cloud computing servers, online databases, and the like that are associated with various disparate entities or service/product providers.

As mentioned above, S210 may function to configure the events computing node with digital event type detection/classification functionality and digital event data routing protocols that enable the events computing node to parse or sift from a plurality of disparate digital events data that is collected and appropriately route the parsed or sifted digital events data for processing at one or more digital events data computing nodes of the digital threat mitigation platform. For example, when the events API identifies a digital event type or classification for collected digital event data, the events API may determine a digital threat mitigation application flow that may be triggered by the digital event data and subsequently, transmit the digital event data to a first processing node of the application flow.

Configuring the digital events computing node to detect and/or classify from the collected digitals events those digitals events that closely match or that may be classified as the digital event type may include using the digital event type data to generate and store a reference data set having one or more of the attributes and/or characteristics of the digital event type. The events computing node may then access and use the reference data set to determine whether the attributes of incoming events data from the events sources sufficiently match the attributes of the stored reference set. The events computing node may determine a match when the correspondence between the attributes of incoming event data matches the attributes of the reference data set satisfies a minimum matching threshold. Alternatively, a fit score may be calculated between the attributes of the incoming event data and the attributes of the stored reference data set and a calculated fit score that satisfies a minimum fit score threshold may be sufficient to classify the incoming digital event data as the digital event type.

Additionally, or alternatively, when the digital events computing node comprises a digital events API, the events API may call to a machine learning system that may be used to classify the incoming digital events data. In this variation, the events API may provide to the machine learning system the incoming digital events data and the machine learning system may function to return a classification for each digital event. In a binary application of the machine learning system, the output may be an indication that the incoming digital event classifies as a digital event type provided in a request from the events API or conversely, does not classify as the digital event type. The machine learning system, in a further variation, may provide a classification of a different digital event type classification.

The digital events computing node may additionally be configured in S210 to route the incoming digital events data according to one or more digital event processing protocols or policy in response to or based on the classification of an incoming digital event as a digital event type. Specifically, the events computing node may transmit or route the incoming digital events to computing nodes associated with application flows that are configured for handling one or more different digital event types.

Additionally, or alternatively, the digital events computing nodes may be configured to be interactive nodes or applications that function to receive second-order inputs based on interactions with an external device. For instance, a computing node may be configured to provide communications (e.g., push notifications, SMS messages, etc.) to a computing device (e.g., a mobile computing device) of a digital actor potentially involved with a digital event.

S220, which includes identifying digital threat mitigation criterion, functions to enable an identification of a set of digital event data processing policy or protocols that may be used to configure the system implementing method 200 to automatically decide (e.g., automated decisioning) a manner of disposal for a digital event classified as a digital event type having an associated application flow. That is, S220 functions to enable automated decisioning of digital events processed by the digital events computing node that may pose a digital threat. The automated decisioning causing the disposal of the digital events may include allowing the event to be processed to completion (e.g., approve transaction, allow continued online user activity, etc.), not allowing the event to be processed to completion (e.g., deny transaction, denied continued user interaction or activities with a digital resource (e.g., a web page) of an entity), routing the digital event to a review queue (e.g., pending further review, heightened or highly scrutinized review, etc.), deploying digital threat mitigation procedures (e.g., flagging transaction, disabling account of actor or user associated with the event, disabling web or Internet connection of user to digital resources, etc.), and the like. The digital threat mitigation procedures may be deployed automatically and near immediately in response to or after determining a digital threat status of the digital event.

The defined digital event data processing policy and/or protocols of the digital threat mitigation criterion, provided in S220, may require a plurality of differentiated stages or levels of digital event evaluation having varying criteria at each computing node of a digital threat mitigation application flow. The evaluation criteria for each of the plurality of differentiated stages of defined policy may include digital event processing logic, such as if-then logic, digital threat scores, digital event location preferences, and/or thresholds that when satisfied by the values of the features or properties of a digital event may trigger an automatic disposal decision. Each stage of the plurality of differentiated stages may include a plurality of event processing logic and/or thresholds or, in some cases, only a single event processing logic or threshold. It shall be noted that the evaluation criteria specified in each of the plurality different stages may vary according to attributes of the digital event data being evaluated and processed. Accordingly, evaluation criteria may be specified for any identifiable or enumerated attribute or feature of the digital event data whether the attribute or feature is germane to the occurrence that defines the digital event data or a system provided feature (e.g., a machine learning-provided feature).

The plurality of differentiated stages of digital event evaluation may be arranged in a sequential order requiring evaluation of digital event data in a predefined manner. For instance, the digital event evaluation policy may indicate that an incoming digital event be evaluated at a first stage or initial stage having a first set of evaluation criteria prior to evaluating the digital event data at a subsequent stage or a second stage. That is, each stage of the plurality of differentiated stages may be considered an edge (e.g., a sub-node having digital threat evaluation criteria) of a computing node that is processed in order such that when executing digital threat mitigation application flows, the digital threat evaluation criteria for each edge is considered for the evaluated digital event data and the first edge in the ordered set of edges that evaluates to true (or is satisfied) first may be traversed by the digital event data. Accordingly, if the attributes or property values of the specific digital event data satisfies the digital threat evaluation criteria for an edge, then the edge may compute a decision for processing or disposition of the digital event data or transmit the digital event data to the next computing node. For instance, if digital event data satisfies sub-node 2 of a first computing node, then sub-node 2 would transmit the digital event data to a second computing node and not sub-node 3 of the first computing node.

Additionally, or alternatively, S220 includes using the defined policy and/or protocols of the digital threat mitigation criterion to configure a digital events automated decisioning computing node. The automated decisioning computing node may be implemented via one or a combination of an automated decisioning API and automated decisions computing server. The automated decisioning computing node preferably functions to receive digital event data after the digital event data has been classified according to one or more digital event types, as the automated decisioning computing node may be classification-specific.

The automated decisioning computing node may be configured to include a plurality of sub-nodes. Each of the plurality of sub-nodes of the automated decisioning computing node may correspond to one of a plurality of digital threat mitigation stages or edges, as described above. Thus, the evaluation criteria of the defined digital threat policy or protocols may be specifically used to configure the computational functionality of the plurality of sub-nodes of the automated decisioning computing node.

Accordingly, each sub-node of the automated decisioning computing node may be configured to receive or collect input of digital event data from the digital events computing node and/or other components of the system implementing method 200. The input from the digital events computing node may include digital event data, digital event metadata (e.g., digital event type, machine learning classifications and scores, etc.) describing attributes and/or values of the digital event data, and the like. The input of digital event data may be received and/or collected at an initial node or first node of a plurality of ordered sub-nodes at the automated decisioning compute node. In a preferred embodiment, the input of the digital event data only passes to a secondary, tertiary, or subsequent sub-node of the plurality of ordered sub-nodes when the input of digital event data does not satisfy the evaluation criteria at the preceding sub-node.

Additionally, or alternatively, each sub-node of the automated decisioning computing node may be specifically configured to perform two primary functions including an evaluation of the input of the digital event data and an identification of a disposal decision for the digital event data or a routing of the digital event data to another computing node capable of determining a disposal decision. The routing functionality is preferably performed by a (default) node when the attributes of digital event data does not match or satisfy the criteria of any of the sub-nodes of the automated decisioning and the digital event data is routed, as a default of the automated decisioning node, to the review queue for a disposal decision. Accordingly, for digital event data that is processed through a digital threat mitigation application flow, a disposal decision will preferably be produced at the automated decisioning node(s) or at the review queue.

The sub-node performing the evaluation of the digital event data, once configured, may function to access evaluation criteria assigned to the sub-node. The evaluation criteria may be any combination of a digital threat score, relevant machine learning features (e.g., evaluation values and/or ranges, etc.), digital event property or attribute values, and the like. The evaluation criteria defined for each sub-node may be any user-defined evaluation criteria and/or machine learned suggested evaluation criteria for digital event data. The sub-node may then identify the relevant attributes of the digital event data to be judged against the accessed evaluation criteria. For example, the evaluation criteria may relate to or include a digital threat score threshold, a time of day of the event, and a geographic location of the occurrence(s) leading to the digital event. In such example, the sub-node may sift through the digital event data to identify a digital threat score, a time at which the digital event occurred, and an originating geographic location of the digital event. The sub-node would judge or compare the attribute values for these three attributes of the digital event data against the defined values and ranges of the corresponding attributes of the evaluation criteria. The sub-node may then function to determine satisfaction and/or a match between the attribute values of the digital event data and the accessed evaluation criteria.

When or if the attribute values of the digital event data do not satisfy and/or does not match the attribute values of the evaluation criteria, the sub-node may be configured not to make a disposal decision of the digital event data and passes the digital event data to a subsequent sub-node of the automated decisioning computing node.

When or if the attribute values of the digital event data satisfy and/or match the attribute values of the evaluation criteria, the sub-node performs disposal decisioning. In such case, the sub-node functions to identify a predetermined disposal decision associated with the sub-node. The predetermined disposal decision associated with the sub-node may include disposal instructions that may be executed by the sub-node. The disposal instructions may include instructions that requires the sub-node to take an automatic decision (e.g., cancel transaction, approve, hold transaction, etc.), which may include routing instructions to a computing node that functions to process the sub-node's disposal decision. The disposal instructions may additionally include instructions for the sub-node to generate additional metadata of the disposal decision to be appended with or included with the digital event data. Thus, the sub-node may function to pass the digital event data together with disposal decision metadata (if any) to an external or subsequent computing node (e.g., outside of the automated decisioning node), effectively traversing the sub-node and automated decisioning node.

Additionally, or alternatively, when or if the attribute values of the digital event data does not satisfy or match the attribute values of the evaluation criteria of each respective sub-node of the automated decisioning computing node, the terminal sub-node of the automated decisioning computing server may pass the digital event data to a default sub-node that, in some embodiments, may be configured to generate an automatic disposal decision of the digital event data without judging the attribute values of the digital event data against attribute values of evaluation criteria. For instance, if the digital event data includes indeterminate attribute values that do not appear to satisfy any sub-node evaluation criteria, the default node may be configured and used to route the digital event data together with an indication of the indeterminate attribute values to a review queue computing node. The transmission of the digital event data to the review queue node may be considered an intermediate disposal decision, as a final disposal decision may be made at the review queue computing node.

Similar to the automated decisioning computing node, the sub-nodes of the review queue computing node may be identified and configured based on defined digital events processing policy. Accordingly, the review queue computing node may include a plurality of sub-nodes including a default node when the evaluation criteria of the sub-nodes may not be satisfied by the attribute values of digital event data. Each of the sub-nodes may be implement by a computing element or computing circuit, such as a component of a main computing server or main computer processing circuit. In some embodiments, a sub-computing server (or sub-server) may be specifically configured to implement the functions of each of the sub-nodes described herein.

The review queue computing node may be configured to enable manual review and semi-automatic decisioning of digital event data.

S230, which includes constructing digital threat mitigation application flows, functions to generate digital threat mitigation application flows according to the digital threat mitigation policy or protocol. Specifically, once each of the plurality of computing (and sub-nodes) required for successfully processing digital event data are configured, S230 functions to marry the nodes together according to the implied or expressly indicated order defined in the mitigation policy.

Figure 3:
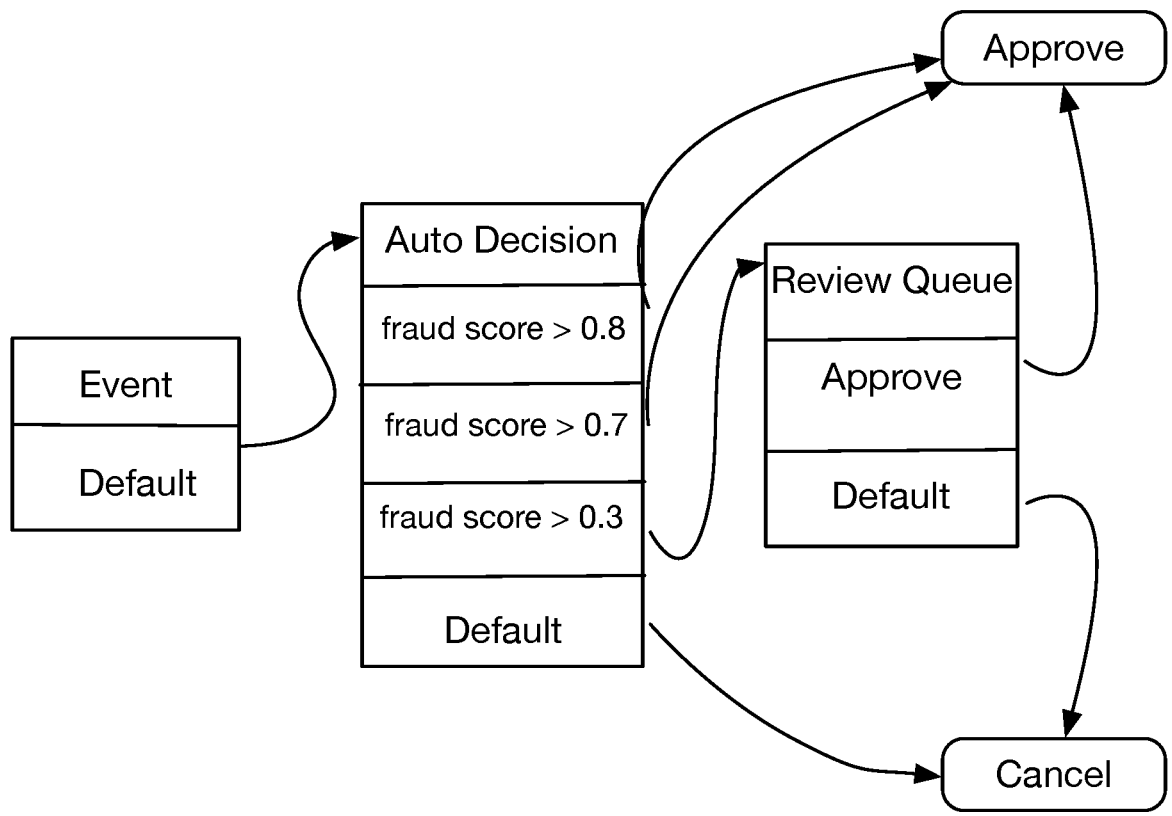
FIG. 3 illustrates an example schematic of a graph in accordance with one or more embodiments of the present application.

In such case, as shown in FIG. 3 the computing nodes as defined by the digital threat mitigation policy may be constructed together to form a digital threat mitigation application flow that may also be digitally represented in the form of an acyclic directed graph. The acyclic directed graph may be used to inform a system implementing method 200 of an immutable required order for processing digital event data that does not loop at any point. By not allowing the application flow to loop, permits the application flow to fail or timeout at nodes that are not performing their respective task and thereby improving latency. Additionally, or alternatively, the computing nodes defined by the digital threat mitigation policy may together form a decision tree in which each node in the decision tree corresponds to a computing node.

S240, which includes deploying a constructed digital threat mitigation application flow into and existing digital threat mitigation scheme, functions to augment a broader digital threat mitigation scheme that may be already implementing fraud detection functionality. Thus, the constructed digital threat mitigation application may be deployed, preferably not to supplant or replace existing digital threat detection protocols, but rather to augment the digital threat detection systems.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning-based method for mitigating digital fraud and digital abuse, the method comprising:
   an events application programming interface (API) that interactively communicates with one or more endpoints of a digital fraud detection and mitigation platform and that collects various digital event data of a predetermined type from one or more online service providers using the digital fraud detection and mitigation platform, wherein the various digital event data of the predetermined type relate to online activities of one or more users involved with one or more digital services provided by an online service provider;
   a threat score API that exposes a machine learning-based threat score using a machine learning-based computation against the various digital event data of the predetermined type collected via the events API, wherein the threat score API interfaces with one or more endpoints of the platform that operate machine learning models that produce threat scores for customers of the digital fraud detection and mitigation platform;

at the digital fraud detection and mitigation platform:
collecting from a distinct online service provider via the events API digital event data;
generating via the threat score API a threat score, produced by the machine learning model endpoints of the threat score API, for the digital event data;
implementing a digital threat evaluation computing node that comprises a plurality of differentiated and disparate evaluation stages, wherein:
each of the plurality of differentiated and disparate evaluation stages comprises predetermined evaluation criteria for evaluating the digital event data, the predetermined evaluation criteria for each of the plurality of differentiated and disparate stages is different,
the plurality of differentiated and disparate evaluation stages are arranged in a sequential ordering requiring a processing of the digital event data and the threat score by each stage in a predefined order, wherein if the processing of the digital event data and the threat score fails at a given stage, the processing of the digital event data and the threat score does not loop at the given stage and times out from the given stage, wherein each of the plurality of differentiated and disparate stages is implemented by distinct circuitry;
setting a distinct minimum threat score threshold at each of the plurality of differentiated and disparate evaluation stages of the computing node, wherein the distinct minimum threat score threshold increases with each successive stage of the plurality of differentiated and disparate evaluation stages of the computing node;
setting, for each of the plurality of differentiated and disparate evaluation stages of the computing node, a distinct routing instruction to a distinct one of a plurality of distinct decisioning nodes;
passing the digital event data and the threat score through one or more of the plurality of differentiated and disparate evaluation stages of the computing node;
evaluating by the computing node one or more of the digital event data and the threat score of the digital event data,
wherein:
if the threat score for the digital event data satisfies or exceeds the distinct minimum threat score threshold at a given stage of the plurality of differentiated and disparate evaluation stages or if a timeout occurs, passing the digital event data and the threat score to a successive stage of the plurality of differentiated and disparate evaluation stages of the computing node until the threat score fails to satisfy the distinct minimum threshold of a successive stage or until an automated decision is achieved at the computing node;
if the threat score for the digital event data does not satisfy the distinct minimum threat score threshold of the given stage of the plurality of differentiated and disparate evaluation stages of the computing node, routing the digital event data and threat score based on the distinct routing instruction for a current stage of the computing node to the distinct one of the plurality of distinct decision nodes away from the computing node;
identifying a disposal decision for the digital event data based on the distinct one of the plurality of distinct decision nodes; and
exposing the disposal decision and the threat score for the digital event data via the threat score API.

2. A system configured to mitigate digital fraud and digital abuse, the system comprising:
an events application programming interface that interactively communicates with one or more endpoints of a digital threat mitigation service and that collects various digital event data from one or more online service providers using the digital fraud detection and mitigation platform, wherein the various digital event data relate to online activities of one or more users involved with one or more digital services provided by an online service provider;
a threat score API that exposes a machine learning-based threat score using a machine learning-based computation against the various digital event data collected via the events API, wherein the threat score API interfaces with one or more endpoints of the platform that operate machine learning models that produce threat scores for customers of the digital fraud detection and mitigation platform; and
one or more hardware computer servers implementing the digital threat mitigation service to:
identify a digital fraud policy that defines a plurality of digital event processing protocols to enable automated decisioning of a disposal decision for digital event data associated with the online service provider and associated with an online transaction, and wherein the digital threat mitigation service uses the digital fraud policy to:
implement an operation of a first computing node that collects via the events API the digital event data associated with the online service provider; and
generate via the threat score API a digital threat score, produced by the machine learning model endpoints of the threat score API, for the digital event data;
implement an operation of a second computing node that comprises a plurality of differentiated and disparate evaluation stages by using the digital fraud policy to set different predetermined evaluation criteria at each of the plurality of differentiated and disparate evaluation stages of the second computing node for processing the digital event data and the associated digital threat score, wherein the plurality of differentiated and disparate evaluation stages are arranged in a sequential ordering requiring a processing of the digital event data and the digital threat score by each stage in a predefined order, wherein if the processing of the digital event data and the digital threat score fails at a given stage, the processing of the digital event data and the digital threat score does not loop at the given stage and times out from the given stage, wherein each of the plurality of differentiated and disparate stages is implemented by distinct circuitry;
set a distinct minimum threat score threshold at each of the plurality of differentiated and disparate evaluation stages of the second computing node, wherein the distinct minimum threat score threshold increases with each successive stage of the plurality of differentiated and disparate evaluation stages of the second computing node;

set, for each of the plurality of differentiated and disparate evaluation stages of the second computing node, a distinct routing instruction to a distinct one of a plurality of distinct disposal computing nodes;
pass the digital event data and the digital threat score through one or more of the plurality of differentiated and disparate evaluation stages of the second computing node;
evaluate by the second computing node one or more of the digital event data and the digital threat score of the digital event data,
wherein:
if the digital threat score for the digital event data satisfies or exceeds the distinct minimum threat score threshold at a given stage of the plurality of differentiated and disparate evaluation stages or if a timeout occurs, pass the digital event data and the digital threat score to a successive stage of the plurality of differentiated and disparate evaluation stages of the second computing node until the digital threat score fails to satisfy the distinct minimum threshold of a successive stage or until an automated decision is achieved at the second computing node;
if the digital threat score for the digital event data does not satisfy the distinct minimum threat score threshold of the given stage of the plurality of differentiated and disparate evaluation stages of the second computing node, route the digital event data and the digital threat score based on the distinct routing instruction for a current stage of the second computing node to the distinct one of the plurality of disposal computing nodes away from the second computing node;
identify a disposal decision for the digital event data based on the distinct one of the plurality of disposal computing nodes; and
expose the disposal decision and digital threat score for the digital event data via the threat score API.

3. The system of claim 2, wherein:
if at least one feature of the digital event data does not traverse a first stage, the second computing node passes the digital event data to a subsequent stage of the plurality of differentiated and disparate stages of the second computing node.

4. The system of claim 2, wherein
digital fraud policy is used to generate an immutable digital decision tree for the plurality of differentiated and disparate stages of the second computing node, wherein the immutable digital decision tree is used to generate a digital event processing flow, wherein the digital event process flow indicates an order of execution of each of the plurality of differentiated and disparate stages of the second computing node.

5. The system of claim 2, wherein
the digital threat score associated with the digital event data is computed by the one or more endpoints operating the machine learning models.

6. The system of claim 2, wherein
one or more attributes of the online transaction associated with the digital event data include one or more of:
a time of occurrence associated with the online transaction, a geolocation associated with the online transaction, an Internet Protocol address associated with the online transaction, user identity associated with the online transaction, amount associated with the online transaction, and system-derived data associated with the online transaction.

7. The system of claim 2,
wherein the predetermined evaluation criteria of one or more of the plurality of differentiated and disparate evaluation stages comprise one or more logic that if applied to at least one attribute of the digital event data evaluates to True, operates to traverse the digital event data from one of the plurality of differentiated and disparate stages to one of the plurality of disposal computing nodes.

8. The system of claim 2, further comprising:
wherein the threat score application programming interface operates to return the digital threat score and the disposal decision output for the online transaction associated with the digital event data.

9. The system of claim 2, wherein
each of the first computing node, the second computing node, and the plurality of disposal computing nodes comprises a disparate computing server of the one or more servers comprising a non-transitory medium storing computer instructions that, when executed by one or more processors, enables each of the first computing node, the second computing node, and the plurality of disposal computing nodes to perform functions in claim 2.

10. The system of claim 2, wherein a configuration application programming interface enables a configuration of each of the first computing node, the second computing node, and each of the plurality of disposal computing nodes.

11. The system of claim 10, wherein
configuring each of the first computing node, the second computing node, and each of the plurality of disposal computing nodes includes:
defining digital event input comprising one or more attributes of the digital event data and one or more associated rules that trigger an operation of the first computing node;
defining an automated disposal decision for each of the plurality of disposal computing nodes that enables each of the plurality of disposal computing nodes to generate output of the disposal decision for the online transaction associated with the digital event data, wherein each automated disposal decision is different.

12. The system of claim 2, wherein
the digital fraud policy is used to generate a graph comprising a digital event data processing order that defines a required order for processing the digital event data at the plurality of differentiated and disparate stages of the second computing node.

13. The system of claim 2, wherein
one or more of the plurality of differentiated and disparate stages of the second computing node include one or more interactive digital event data processing protocols that require second-order inputs from a user of an external computing device associated with the online transaction associated with the digital event data.

14. The system of claim 2, wherein
the plurality of disposal computing nodes include one or more of:
an approval computing node that computes the disposal decision output comprising an automatic approval of the online transaction associated with the digital event data;

a cancellation computing node that computes the disposal decision output comprising an automatic cancellation of the online transaction associated with the digital event data; and a review queue computing node that computes the disposal decision output comprising an automatic hold of the online transaction associated with the digital event data.

15. The system of claim 2, wherein the disposal decision output for the online transaction associated with the digital event data that is computed by one or more of the plurality of disposal computing nodes is converted to machine learning input; and the machine learning input from the one or more of the plurality of disposal computing nodes is provided as training input into the machine learning models wherein the training input is used to tune one or more of the machine learning models of the machine learning models to improve digital threat detection capabilities of the machine learning models.

* * * * *